US009254869B2

United States Patent
Ryne et al.

(10) Patent No.: US 9,254,869 B2
(45) Date of Patent: Feb. 9, 2016

(54) HAND WHEEL POSITION DETECTION SYSTEM

(75) Inventors: Zaki Ryne, Saginaw, MI (US); Keith A. Kidder, Saginaw, MI (US); Tomy Sebastian, Saginaw, MI (US); Carl D. Tarum, Saginaw, MI (US); Paul M. Fisher, Saginaw, MI (US); Christian E. Ross, Feeland, MI (US); Scott T. Blehm, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 164 days.

(21) Appl. No.: 13/554,017

(22) Filed: Jul. 20, 2012

(65) Prior Publication Data

US 2013/0166141 A1    Jun. 27, 2013

Related U.S. Application Data

(60) Provisional application No. 61/579,770, filed on Dec. 23, 2011.

(51) Int. Cl.
*G01M 17/00* (2006.01)
*B62D 15/02* (2006.01)
*G01D 5/14* (2006.01)
*G01D 3/036* (2006.01)

(52) U.S. Cl.
CPC ........ *B62D 15/0245* (2013.01); *B62D 15/0215* (2013.01); *G01D 3/0365* (2013.01); *G01D 5/145* (2013.01)

(58) Field of Classification Search
USPC .......................... 701/34; 324/76.77, 141, 166
See application file for complete search history.

(56) References Cited

U.S. PATENT DOCUMENTS

| | | | | |
|---|---|---|---|---|
| 5,675,250 A | * | 10/1997 | Berglund | G01D 5/2515 324/207.2 |
| 8,278,914 B2 | * | 10/2012 | Tanaka | G01D 5/06 324/167 |
| 8,558,534 B2 | * | 10/2013 | Tomita | B62D 5/0484 318/609 |
| 2003/0028288 A1 | * | 2/2003 | Wendling | G05B 9/02 700/279 |
| 2014/0012229 A1 | * | 1/2014 | Bokelman | A61M 5/20 604/506 |

FOREIGN PATENT DOCUMENTS

| | | |
|---|---|---|
| CN | 101534630 A | 9/2009 |
| CN | 101722986 A | 6/2010 |
| CN | 101466996 B | 10/2012 |

(Continued)

OTHER PUBLICATIONS

Derwent Pub. No. 2008-F35419 to Abe F.*

(Continued)

*Primary Examiner* — John R Olszewski
*Assistant Examiner* — Jean-Paul Cass
(74) *Attorney, Agent, or Firm* — Cantor Colburn LLP

(57) ABSTRACT

A steering system for detecting a hand wheel position is provided and includes an input shaft connected to a hand wheel, a main gear disposed around the input shaft, a puck gear meshingly engaged with the main gear, and a control module. The control module receives an angular main position of the main gear and an angular puck position of the puck gear. The control module includes a rotational calculation module for calculating the hand wheel position based on at least the angular main position and the angular puck position.

14 Claims, 6 Drawing Sheets

(56) References Cited

FOREIGN PATENT DOCUMENTS

| | | | | |
|---|---|---|---|---|
| EP | 1574421 | * | 9/2005 | |
| EP | 1574421 A1 | | 9/2005 | |
| EP | 2034267 A1 | * | 3/2009 | G01D 5/14 |
| EP | 2034267 A1 | | 11/2009 | |
| EP | 2180296 A1 | * | 4/2010 | G01D 5/14 |
| WO | 2005043074 A1 | | 5/2005 | |
| WO | 2007107649 A1 | | 9/2007 | |
| WO | 2007139868 A2 | | 12/2007 | |
| WO | WO2007145296 | * | 12/2007 | |

OTHER PUBLICATIONS

Derwent Pub. No. 2005-632260 to Froehlich E. dated Sep. 14, 2005.*
European Search Report for European Application No. 12197749.0; Dated: Jun. 10, 2013; 7 pages.
European Office Action for Application No. 12197749.0-1755 dated Apr. 2, 2014; 4 pages.
Chinese Office Action issued Jan. 6, 2015 in corresponding Chinese Application No. 201210560895.5.

* cited by examiner

HAND WHEEL POSITION DETECTION SYSTEM

CROSS-REFERENCES TO RELATED APPLICATIONS

This patent application claims priority to U.S. Provisional Patent Application Ser. No. 61/579,770 filed Dec. 23, 2011 which is hereby incorporated herein by reference in its entirety.

BACKGROUND OF THE INVENTION

The present invention relates to a steering system, and more particularly to a steering system for detecting a hand wheel position.

Some types of steering systems may require the detection of hand wheel position to provide safety features, or for certain types of algorithms. Several approaches currently exist for determining the hand wheel position. However, some of these approaches may not include the level of precision that is needed. For example, one type of hand wheel position detection system may require a five degree diagnostic limit Hand wheel position detection systems that are currently available may not be able to meet this requirement.

SUMMARY OF THE INVENTION

According to one aspect of the invention, a steering system for detecting a hand wheel position is provided. The steering system includes an input shaft connected to a hand wheel, a main gear disposed around the input shaft, a puck gear meshingly engaged with the main gear, and a control module. The control module receives an angular main position of the main gear and an angular puck position of the puck gear. The control module includes a rotational calculation module for calculating the hand wheel position based on at least the angular main position and the angular puck position.

According to another aspect of the invention, a steering system for detecting a hand wheel position is provided. The steering system includes an input shaft connected to a hand wheel, a main gear disposed around the input shaft, a puck gear meshingly engaged with the main gear, and a control module. The control module receives an angular main position of the main gear and an angular puck position of the puck gear. The control module includes a rotational calculation module for calculating the hand wheel position based on at least the angular main position and the angular puck position. The control module includes a diagnostic module for determining an error of the hand wheel position by comparing the hand wheel position with a second hand wheel position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
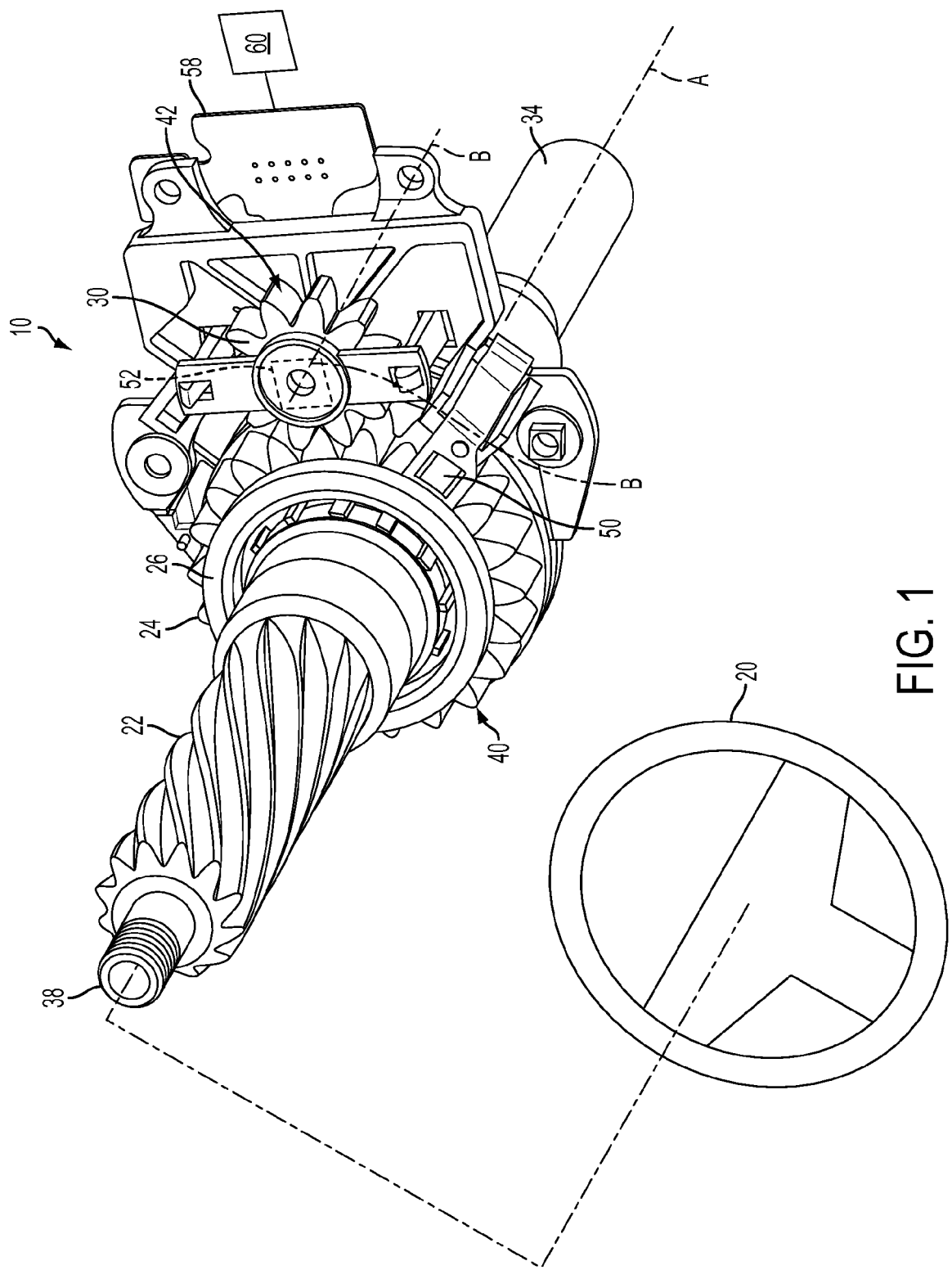
FIG. 1 is an exemplary steering system for detecting a hand wheel position according to one aspect of the invention.

Referring now to FIG. 1, where the invention will be described with reference to specific embodiments without limiting same, an exemplary embodiment of a steering system 10 is illustrated. The steering system 10 includes a hand wheel 20, an input shaft 22, a main gear 24, a ring magnet 26, a puck gear 30, and an output shaft 34. A distal end 38 of the input shaft 22 attaches to the hand wheel 20. The input shaft 22 and the output shaft 34 both extend along a longitudinal axis A-A. The steering system 10 is configured for detecting an angular position of the hand wheel 20 as the hand wheel 20 is rotated about the longitudinal axis A-A by an operator. In one embodiment, the hand wheel 20 may be rotated by an operator to manipulate a vehicle (not shown), however it is understood that the steering system 10 may be used in a variety of approaches.

The ring magnet 26 is disposed around the input shaft 22 and is located within the main gear 24. The puck gear 30 includes a puck magnet (not shown) that is molded into the puck gear 30. In the exemplary embodiment as shown in FIG. 1, the main gear 24 and the puck gear 30 are spur gears. A plurality of teeth 40 of the main gear 24 are meshingly engaged with the plurality of teeth 42 of the puck gear 30. As the input shaft 22 is rotated about the longitudinal axis A-A by the hand wheel 20, the main gear 24 rotates about the longitudinal axis A-A as well. The main gear 24 drives the puck gear 30, where the puck gear 30 rotates about a secondary axis B-B that is offset from the longitudinal axis A-A. In one embodiment, the main gear 24 and the puck gear 30 have a gear ratio of about 1:2.2.

A plurality of first magnetic field sensors 50 are provided for detecting the position of the ring magnet 26 located within the main gear 24, and plurality of second magnetic field sensors 52 are provided for detecting the position of the puck gear 30 (the second magnetic field sensor 52 is shown in phantom line). The first and second magnetic field sensors 50 and 52 may be any type of sensor for detecting the angular position of the ring magnet 36 or the puck gear 30 such as, for example, a Hall effect sensor. A control module 60 is in communication with the first magnetic field sensors 50 and the second magnetic field sensors 52 through an interface 58.

Figure 2:
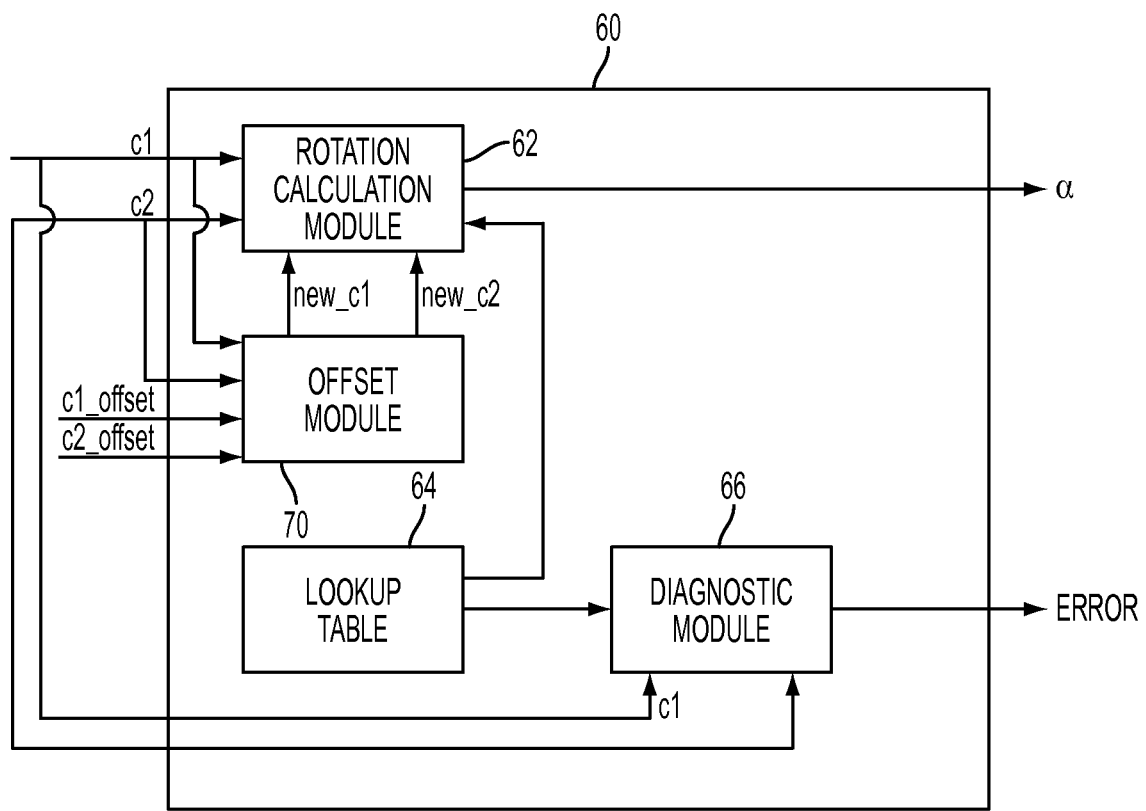
FIG. 2 is a dataflow diagram illustrating a control module shown in FIG. 1, according to another aspect of the invention.

The control module 60 controls the operation of the power steering system 10. Referring now to FIG. 2, a dataflow diagram illustrates an exemplary embodiment of the control module 60 of FIG. 1 used to control the steering system 10 of FIG. 1. In various embodiments, the control module 60 may include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly determine the angular position of the hand wheel 20.

Figure 3:
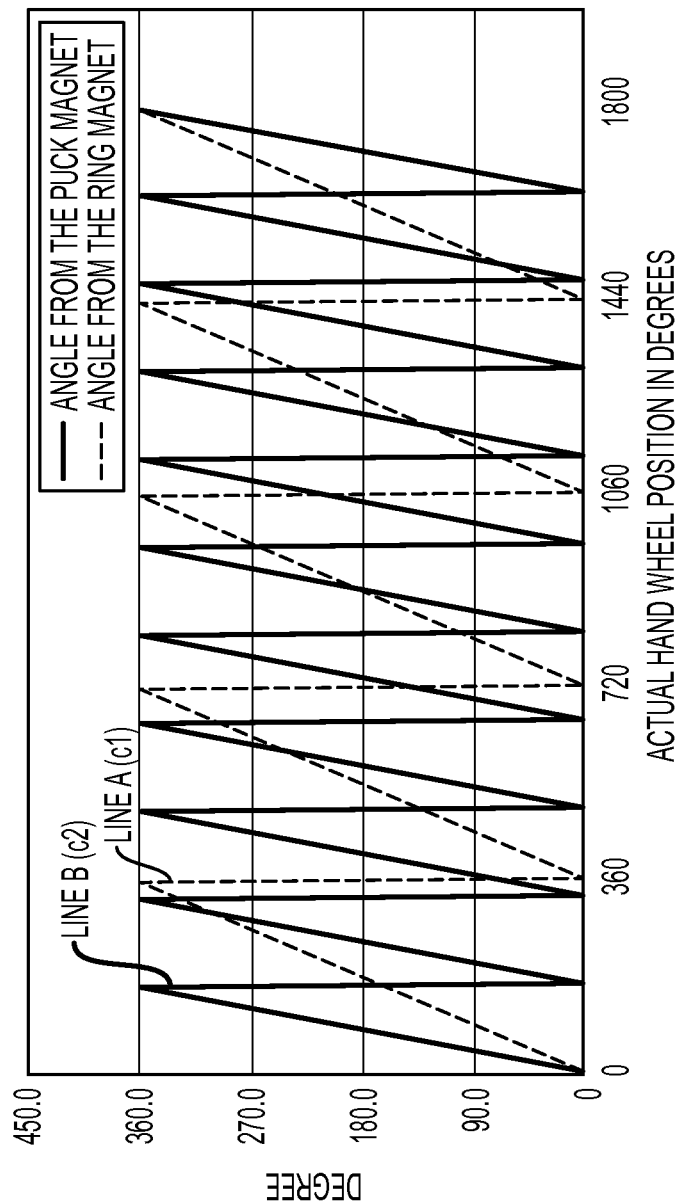
FIG. 3 is a graph illustrating an output of a first magnetic sensor and a second magnetic sensor shown in FIG. 1, according to yet another aspect of the invention.

FIG. 3 is a graph illustrating the output of the first and second magnetic field sensors 50 and 52 as the hand wheel 20 (shown in FIG. 1) is rotated about the longitudinal axis A-A. Specifically, FIG. 3 illustrates five revolutions of the hand wheel 20 (which is a rotation of about 1799 degrees). FIG. 3 also shows the respective angular positions of the ring magnet 26 (shown in FIG. 1) denoted as Line A and the puck gear 30 denoted as Line B, which range from about 0 to about 360 degrees. Referring now to both FIGS. 1-3, the control module 60 receives as inputs the angular position from the ring magnet 26 (shown in FIG. 1), which is denoted as $c_1$, as well as the angular position from the puck gear 30 (shown in FIG. 1), which is denoted as $c_2$.

Figure 4:
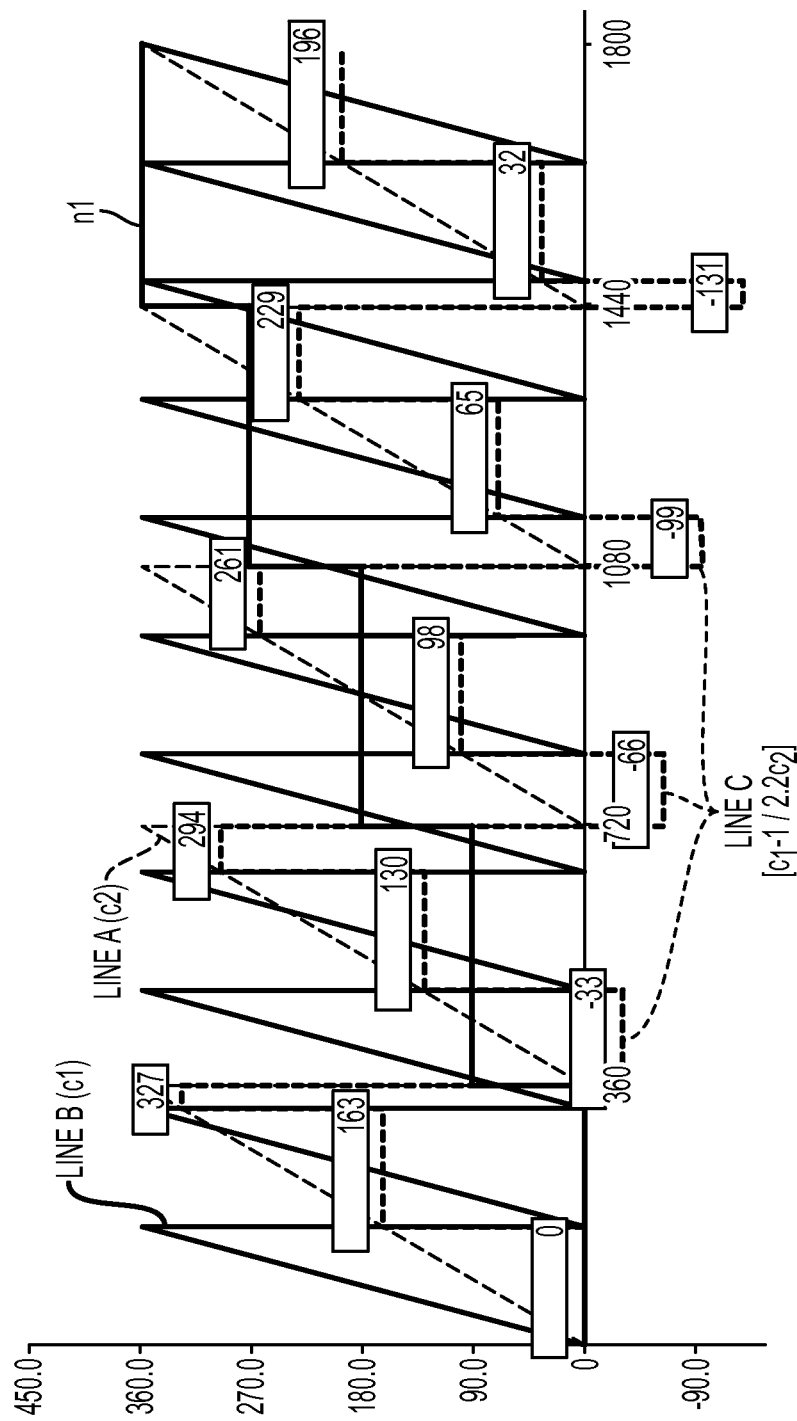
FIG. 4 is another graph illustrating an output of a first magnetic sensor and a second magnetic sensor shown in FIG. 1, according to yet another aspect of the invention.

FIG. 2 illustrates the control module 60 including a rotational calculation module 62, a lookup table 64, a diagnostic module 66, and an offset module 70. The rotational calculation module 62 receives as inputs the ring magnet angle $c_1$ and the puck gear angle $c_2$. A hand wheel position α is related to the ring magnet angle $c_1$ and the puck gear angle $c_2$ by equations 1-3:

$$c_1 = \alpha - 360 n_1 \quad \text{(Equation 1)}$$

$$c_2 = G\alpha - 360 n_2 \quad \text{(Equation 2)}$$

$$\alpha = c_1 + 360 n_1 \quad \text{(Equation 3)}$$

where $n_1$ is the number of rotations of the input shaft 22 (having a total of 5 rotations, within the range of 0 to 1799 degrees) and $n_2$ is the number of rotations of the puck gear 30 (having a total of 11 rotations). Using equations 1-2 above, equation 4 may be derived as:

$$1/360[c_1 - 1/G\, c_2] = 1/G\, n_2 - n_1 \quad \text{(Equation 4)}$$

where G is the gear ratio. For a given value of $n_1$ and $n_2$, there is a unique value for $[c_1 - 1/G\, c_2]$. The term $[c_1 - 1/G\, c_2]$ is an empirical value that is used to determine the number of rotations of the input shaft $n_1$. In one approach, a gear ratio of 1:2.2 may be used (e.g., thus equation 4 would be $1/360[c_1 - 1/2.2\, c_2] = 1/2.2\, n_2 - n_1$). Turning now to FIG. 4, based on equation 4, the term $[c_1 - 1/G\, c_2]$ is plotted as a dashed line, and is referred to as Line C. Based on Line C shown in FIG. 4, the following Table 1 may be generated in a memory of the control module 60, and is saved as the lookup table 64 (shown in FIG. 2):

TABLE 1

| Line C Level | $n_1$ | $n_2$ |
|---|---|---|
| 0 | 0 | 0 |
| 163 | 0 | 1 |
| 327 | 0 | 2 |
| -33 | 1 | 2 |
| 130 | 1 | 3 |
| 294 | 1 | 4 |
| -66 | 2 | 4 |
| 98 | 2 | 5 |
| 261 | 2 | 6 |
| -99 | 3 | 6 |
| 65 | 3 | 7 |
| 229 | 3 | 8 |
| -131 | 4 | 8 |
| 32 | 4 | 9 |
| 196 | 4 | 10 |

Referring now to Table 1 and FIGS. 2-4, the rotational calculation module 62 determines the value for the term $[c_1 - 1/G\, c_2]$ using Line C in FIG. 4. It should be noted that because the values for Line C are substantially different from one another (i.e. each of the values for Line C have a difference of at least about thirty degrees from one another), the values are tolerable to noise. The rotational calculation module 62 then finds the value for the number of rotations of the input shaft $n_1$ using Table 1. The rotational calculation module 62 then calculates the value of the hand wheel position α using equation 3. For example, if the inputs into the rotational calculation module 62 are 290 for the ring magnet angle $c_1$ and 350 for the puck gear angle $c_2$, then the term $[c_1 - 1/G\, c_2]$ yields 130. Referring to Table 1, if Line C (shown in FIG. 4) has a value of 130, then $n_1$ is 1. Therefore, using equation 3, the hand wheel position α will be 650 degrees.

Figure 5:
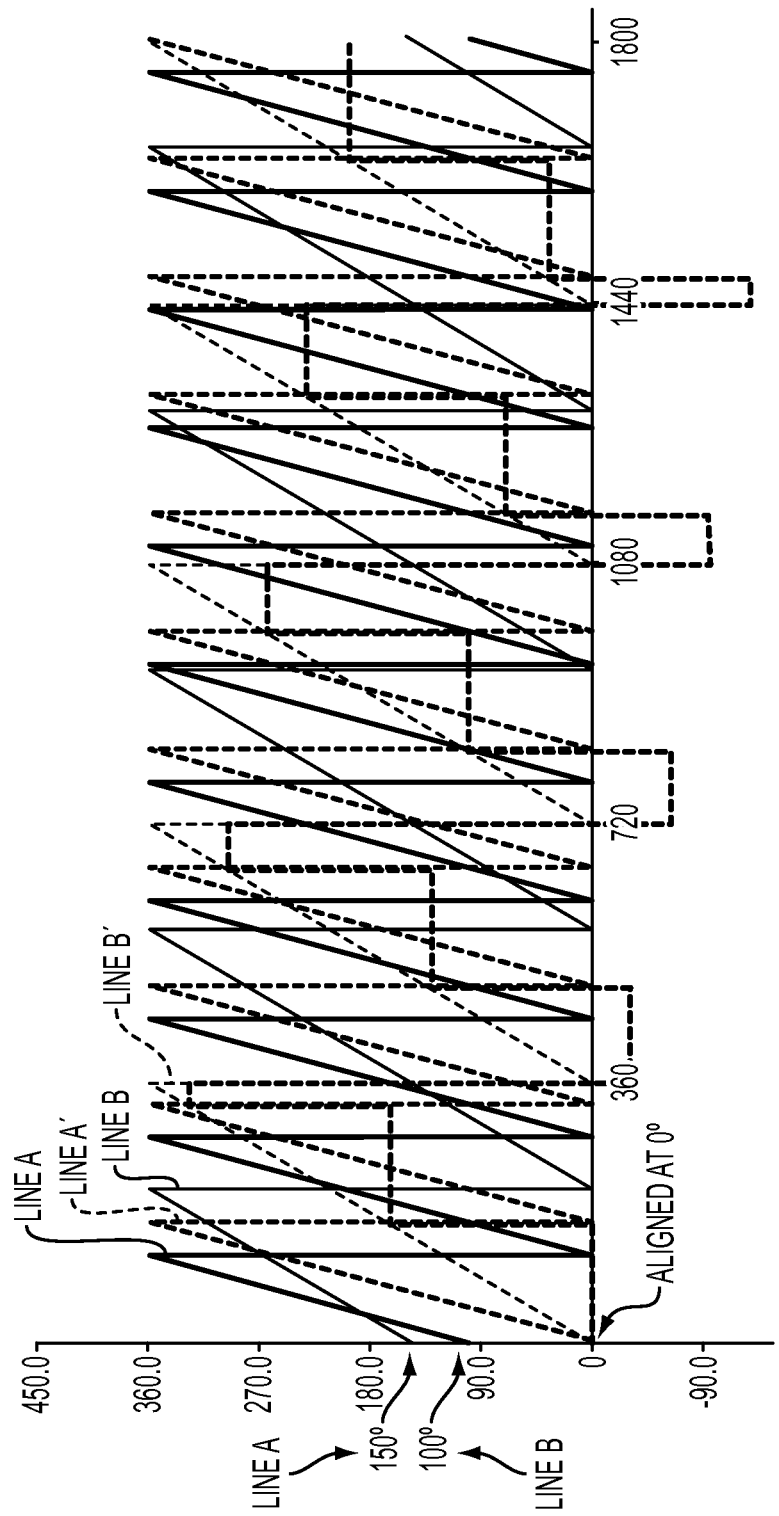
FIG. 5 is yet another graph illustrating an output of a first magnetic sensor and a second magnetic sensor shown in FIG. 1, according to yet another aspect of the invention.

Referring to FIGS. 1 and 3-4, the respective positions of the ring magnet 26 (Line A) and the puck gear 30 (Line B) should be generally aligned at zero degrees (at the hand wheel position) to accurately calculate the hand wheel position α. However, referring now to FIG. 5, sometimes the positions of the ring magnet 26 (Line A) and the puck gear 30 (Line B) are not aligned at zero degrees. For example, FIG. 5 illustrates Line A with an offset of 150 degrees and Line B with an offset of 100 degrees. In this example, the offset module 70 includes an alignment algorithm for adjusting the values of the ring magnet angle $c_1$ and the puck gear angle $c_2$. The alignment algorithm results in adjusted values for Line A and Line B, and are denoted as Line A' and Line B' (shown in phantom line). In one embodiment, the offset module 70 (shown in FIG. 2) calculates values for a new ring magnet angle new_$c_1$ using the following algorithm:

If $(c_1 - c_{1\_offset}) < 0$ new_$c1 = (c_1 - c_{1\_offset}) + 360$

Else if $(c_1 - c_{1\_offset}) > 360$ new_$c_1 = (c_1 - c_{1\_offset}) - 360$

Else new_$c_1 = c_1$ where $c_1$ is the position of the ring magnet 26 indicated by Line A', and $c_{1\_new}$ is 150 degrees. A similar algorithm may be provided to calculate a new puck gear angle new_$c_2$ as well.

Referring to FIGS. 1-4, during operation of the steering assembly 10, issues such as, for example, a sudden glitch in one of the signals for the ring magnet angle $c_1$ or the puck gear angle $c_2$, noise in the signals for the ring magnet angle $c_1$ or the puck gear angle $c_2$, gear slippage between the ring magnet 26 and the puck gear 30, breakage of either the teeth 40 of the main gear 24 or the teeth 42 of the puck gear 30, gear lash, or the ring magnet 26 falling off the main gear 24 may occur. These issues may be detected by a diagnostic algorithm that is calculated by the diagnostic module 66 shown in FIG. 2. The diagnostic module 66 calculates separate values for the hand wheel position α based on the ring magnet angle c1 and the puck gear angle c2, respectively. Specifically, the diagnostic module 66 receives as inputs the ring magnet angle $c_1$ and the puck gear angle $c_2$, as well as the number of rotations of the input shaft $n_1$ and the number of rotations of the puck gear $n_2$. The diagnostic module 66 calculates the hand wheel position α using equation 3, and a second hand wheel position α' using equation 5:

$$\alpha' = (c_2 + 360 n_2)/G \quad \text{(Equation 5)}$$

The diagnostic module 66 then determines the error within the hand wheel position α by comparing the hand wheel position $\alpha$ using equation 3, and a second hand wheel position $\alpha'$, and determining if the difference between the two values is above a threshold value. The error may be calculated by equation 6:

$$|\alpha-\alpha'|=\text{Error} \qquad \text{(Equation 6)}$$

The error in equation 6 may be set to any threshold value. In one exemplary embodiment, the error may be set to a threshold value of five degrees. Thus, if the term $|\alpha-\alpha'|$ results in more than five degrees, this indicates the error has exceeded the threshold value.

Figure 6:
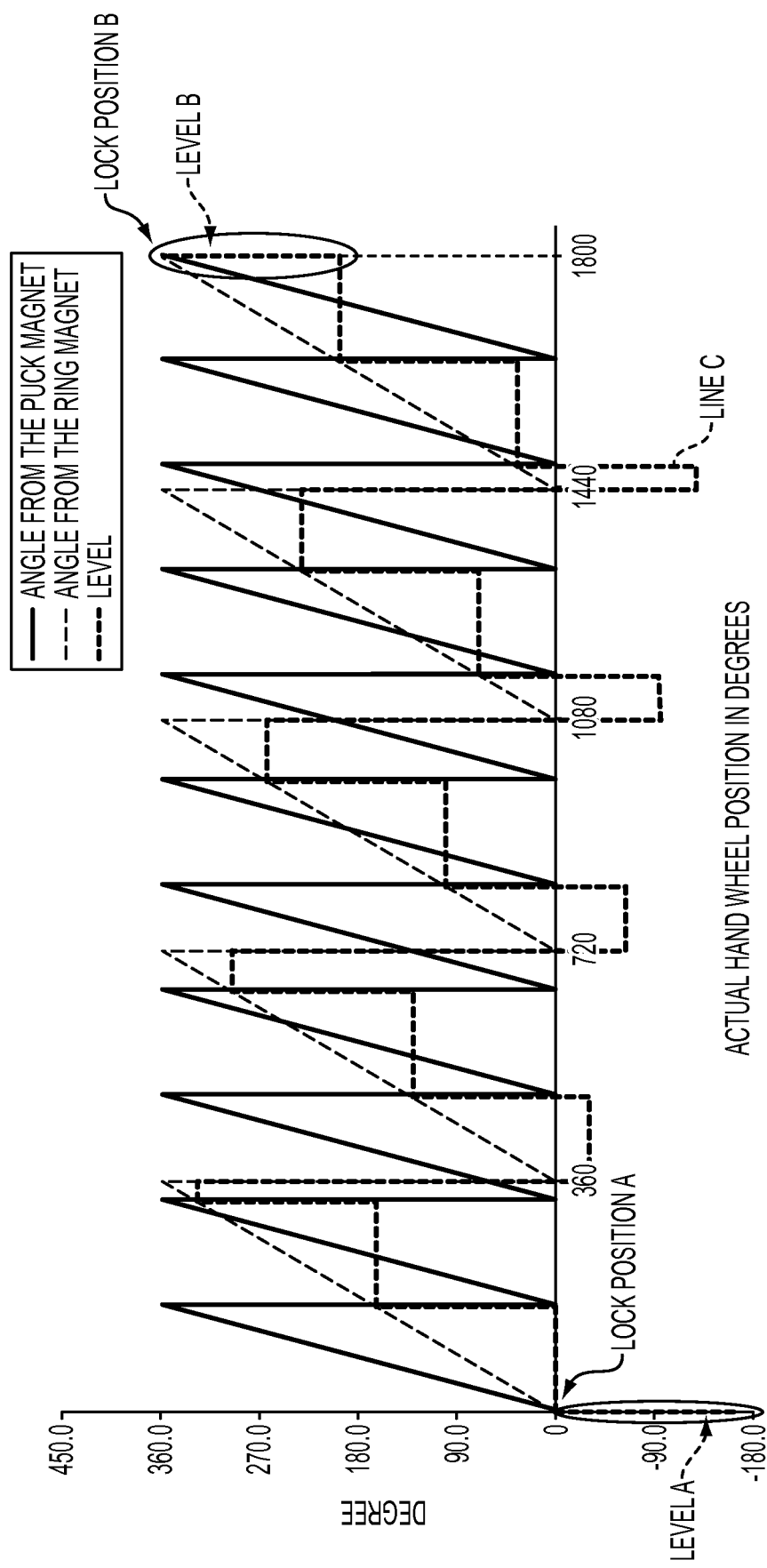
FIG. 6 is another graph illustrating yet another output of a first magnetic sensor and a second magnetic sensor shown in FIG. 1, according to yet another aspect of the invention.

Turning now to FIG. 6, gear lashing between the main gear 24 and the puck gear 30 may occur, which may result in rollover values near a Lock Position A (located at about zero degrees) and a Lock Position B (located at about 1799 degrees). Thus, Line C may include additional values, where a Level A value and a Level B value is included. In the exemplary embodiment as shown, the Level A value is about −163 degrees and the Level B value is about 359 degrees.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering system for detecting a hand wheel position, comprising:
    an input shaft connected to a hand wheel;
    a main gear disposed around the input shaft;
    a puck gear meshingly engaged with the main gear; and
    a control module, implemented in a hardware processor, for:
        receiving an angular main position of the main gear and an angular puck position of the puck gear;
        setting an empirical value equal to $c_1 - 1/G\, c_2$, wherein $c_1$ is the angular main position, $c_2$ is the angular puck position, an G is the gear ratio;
        finding a number of rotations of the input a number of rotations of the puck gear using the empirical value;
        calculating a first hand wheel position based on the number of rotations of the input shaft;
        calculating a second hand wheel position based on the number of rotations of the puck gear; and
        determining that the first hand wheel position is incorrect if a difference between the first hand wheel position and the second wheel position is above a threshold value.

2. The steering system as recited in claim 1, wherein the control module uses equations: $c_1=\alpha-360n_1$, $c_2=G\,\alpha-360n_2$, and $\alpha=c_1+360n_1$, wherein $\alpha$ is the hand wheel position, $n_1$ is a number of rotations of the input shaft, and $n_2$ is a number of rotations of the puck gear.

3. The steering system as recited in claim 2, empirical values computed by the term $[c_1 - 1/G\, c_2]$ differ from one another by at least thirty degrees depending on the angular main position $c_1$, the angular puck position $c_2$, the hand wheel position $\alpha$, the number of rotations of the input shaft $n_1$, and the number of rotations of the puck gear $n_2$.

4. The steering system as recited in claim 1, wherein a position of the main gear and a position of the puck gear are aligned generally at zero degrees.

5. The steering system as recited in claim 1, wherein a position of the main gear and a position of the puck gear are offset from zero degrees.

6. The steering system as recited in claim 5, wherein the control module is further configured for executing an alignment algorithm for adjusting the position of the main gear and the position of the puck gear.

7. The steering system as recited in claim 1, wherein the control module is further for finding a number of rotations of the puck gear using the empirical value.

8. The steering system as recited in claim 1, wherein the control module calculates the second hand wheel position using an equation: $\alpha'=(c_2+360n_2)/G$, wherein $\alpha'$ is the second hand wheel position, and $n_2$ is a number of rotations of the puck gear.

9. A steering system for detecting a hand wheel position, comprising:
    an input shaft connected to a hand wheel;
    a main gear disposed around the input shaft;
    a puck gear meshingly engaged with the main gear; and
    a control module, implemented in a hardware processor, for:
        receiving an angular main position of the main gear and an angular puck position of the puck gear;
        setting an empirical value equal to $c_1 - 1/G\, c_2$ wherein $c_1$ is the angular main position, $c_2$ is the angular puck position, $\alpha$ is the hand wheel position, an G is the gear ratio;
        finding a number of rotations of the input shaft from a lookup table saved in a memory of the control module using the empirical value; and
        calculating the hand wheel position based on the number of rotations of the input shaft,
    wherein the hand wheel position is related to the angular main position and the angular puck position by: $c_1=\alpha-360n_1$, $c_2=G\,\alpha-360n_2$, and $\alpha=c_1+360n_1$, wherein $\alpha$ is the hand wheel position, $n_1$ is the number of rotations of the input shaft, and $n_2$ is a number of rotations of the puck gear.

10. The steering system as recited in claim 9, wherein empirical values computed by the result of $c_1 - 1/G\, c_2$ differ from one another by at least thirty degrees depending on the angular main position $c_1$, the angular puck position $c_2$, the hand wheel position $\alpha$, the number of rotations of the input shaft $n_1$, and the number of rotations of the puck gear $n_2$.

11. The steering system as recited in claim 9, wherein a position of the main gear and a position of the puck gear are aligned generally at zero degrees.

12. The steering system as recited in claim 9, wherein a position of the main gear and a position of the puck gear are offset from zero degrees.

13. The steering system as recited in claim 12, wherein the control module is further configured for executing an alignment algorithm for adjusting the position of the main gear and the position of the puck gear.

14. The steering system as recited in claim 9, wherein the control module is further for finding a number of rotations of the puck gear from the lookup table using the empirical value, and wherein the second hand wheel position is calculated by using an equation:

$$\alpha'=(c_2+360n_2)/G$$

wherein $\alpha'$ is the second hand wheel position.

\* \* \* \* \*